Patented Aug. 9, 1932

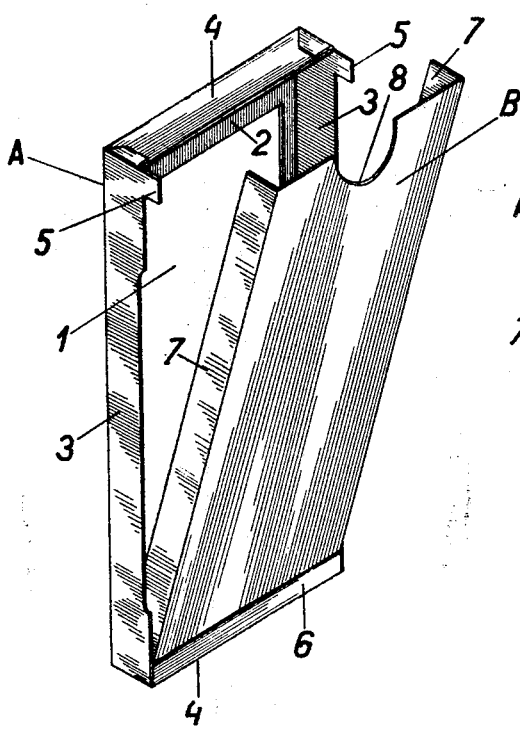
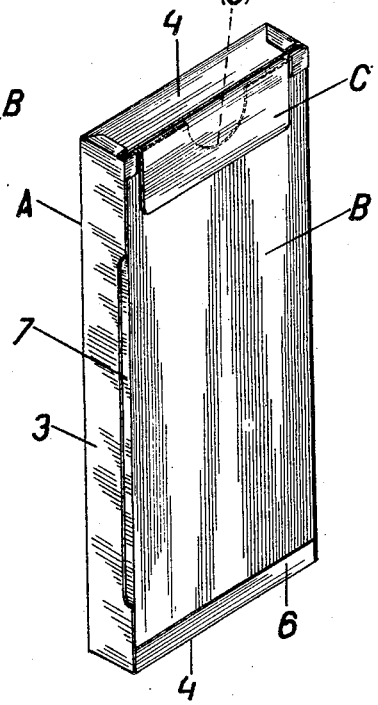
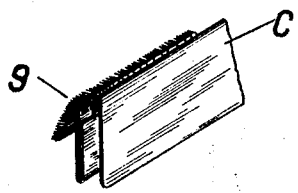

1,871,217

UNITED STATES PATENT OFFICE

RUDOLF KLAUS, OF DESSAU-ZIEBIGK IN ANHALT, GERMANY, ASSIGNOR TO AGFA ANSCO CORPORATION, OF BINGHAMTON, NEW YORK, A CORPORATION OF NEW YORK

FILM PACK CASING

Application filed June 8, 1931, Serial No. 542,934, and in Germany June 5, 1930.

My present invention relates to a photographic film pack casing and more particularly to an improvement in such a casing allowing to easily take out the exposed films from the pack and to adjust the pack again for use in daylight by a simple manipulation.

The invention further consists in certain novel features of construction and arrangements of parts which will be fully understood from the following description, reference being made to the accompanying drawing.

In the drawing:—

Fig. I illustrates a half-opened film pack casing,

Fig. II the closed casing and

Fig. III shows in detail a part necessary for rendering light-tight the closed casing.

According to this invention, a simple film pack casing is made by constructing from one piece only by punching and bending the main body containing the exposure window, and the partition wall necessary for dividing the casing into a front compartment for the unexposed films and a rear compartment for the exposed films. This main body can be combined with a back part likewise made of one piece. It is the peculiar construction of this back part in combination with an insert of peculiar form which simplifies the removal of the exposed films from the casing.

The main body or the front compartment A contains the exposure window 1 cut in the front wall 2. The bodies of the front wall are bent at right angles and form the side walls 3 and 4. The corners of the frame formed by the said walls are protected against the entry of light in any suitable manner, for instance, by folding them in such a way that they overlap each other. At the upper end 4 a partition wall that divides the casing into two compartments, is provided. For the sake of clarity, this partition wall is not shown in the drawing. At the upper end of the side walls 3 there are provided projections 5 forming a part of the main body. The lower end 4 of the main body bears an edge or flange 6 at a right angle to said end 4. Three edges of the rear part B are bent at a right angle and form the lower end (not seen in the figures) and the side walls 7. The corners of the frame formed by the side walls, can be rendered light-tight by folding the ends of the side walls, so that they overlap each other. At the upper end there is provided no wall but the part B has a cut-out portion 8 which allows of seizing the exposed films situated in the rear compartment of the film pack casing.

The film pack casing is, when being in use, protected against entry of light by a resilient metal strip C, having a U-shaped portion, fitted over the upper edge of the rear part B. This strip must be longer than the cut-out portion 8 in the rear wall, whereas its breadth is about equal to that of the back wall. The side of the strip C which faces the draw-tabs of the films, bears a velvet strip 9 whereby light is completely prevented from entering the opening through which the tabs are guided outwards.

The film pack casing is assembled in the following manner:—

When loading the film pack casing, the films fixed to the draw-tabs are disposed in the known manner between the exposure window and the partition wall, whereas the draw-tabs are passed around the guide way provided on the partition wall to the other side of the partition. Subsequently, the rear casing B is inserted with the lower end in the flange 6 of the main body. In this manner, the main or front compartment A and the rear compartment B are assembled in the way of a hinge. The casing is closed by turning the rear part B towards the front compartment A. The projections 5 of the main body are bent at a right angle towards the rear wall of part B, and cooperating with the flanged edge 6 of the main body A they hold the rear part and the main body together. Then the resilient strip C is inserted into the slit formed at the upper narrow side of the casing, so that the velvet strip 9 faces the draw-tabs.

With this mode of construction it is no longer necessary to unfold the two parts A and B of the film pack casing in order to take out the exposed films. When the exposed films are to be taken out of the rear compartment of the film pack casing, the operator in a dark room only need take off the metal strip C from the back part B. Thereby the cut-out portion 8 in the back wall becomes free and the films become well accessible. If the film pack casing shall be adjusted again for use in daylight, the metal strip C is fitted again on the upper edge of the rear wall of part B.

What I claim is:—

1. A film pack casing comprising a main front part and a rear part, said rear part fitting closely into the front part, thus procuring a light-tight closure of the side walls and one end of the casing, and forming with the front part a slit extending over the whole breadth of said rear part, said rear part being provided with a cut-out adjacent to said slit, and a resilient metal strip having a U-shaped portion removably inserted into said slit and covering said cut-out in the rear part.

2. A film pack casing comprising a main front part and a rear part, said rear part fitting closely into the front part, thus procuring a light-tight closure of the side walls and one end of the casing, and forming with the front part a slit extending over the whole breadth of said rear part, said rear part being provided with a cut-out adjacent to said slit, and a resilient metal strip having a U-shaped portion having the breadth of the rear part and bearing a velvet strip, said metal strip being removably inserted into said slit and covering said cut-out in the rear part.

In testimony whereof I affix my signature.

RUDOLF KLAUS.